(12) United States Patent
Adams et al.

(10) Patent No.: US 8,725,664 B1
(45) Date of Patent: May 13, 2014

(54) MEASURING PERSPECTIVE OF A FACTOR IN A DECISION

(75) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 61 days.

(21) Appl. No.: 13/467,657

(22) Filed: May 9, 2012

Related U.S. Application Data

(63) Continuation of application No. 12/646,099, filed on Dec. 23, 2009, now Pat. No. 8,239,338.

(51) Int. Cl.
*G06N 5/00* (2006.01)

(52) U.S. Cl.
USPC .............................................. 706/12; 706/45

(58) Field of Classification Search
USPC ..................................................... 706/12, 45
See application file for complete search history.

(56) References Cited

U.S. PATENT DOCUMENTS

| | | | |
|---|---|---|---|
| 5,844,817 A | 12/1998 | Lobley et al. | |
| 6,151,565 A | 11/2000 | Lobley et al. | |
| 6,502,126 B1 | 12/2002 | Pendakur | |
| 6,643,645 B1 | 11/2003 | Fayyad et al. | |
| 6,785,709 B1 | 8/2004 | Pendakur | |
| 6,850,891 B1 | 2/2005 | Forman | |
| 6,882,989 B2 | 4/2005 | Stevens | |
| 6,907,566 B1 | 6/2005 | McElfresh et al. | |
| 6,963,901 B1 | 11/2005 | Bates et al. | |
| 7,080,071 B2 | 7/2006 | Henrion et al. | |
| 7,203,755 B2 | 4/2007 | Zhu et al. | |
| 7,257,566 B2 | 8/2007 | Danielson et al. | |
| 7,353,253 B1 | 4/2008 | Zhao | |
| 7,398,257 B2 | 7/2008 | Kaji | |
| 7,542,952 B2 | 6/2009 | Yang et al. | |
| 7,552,104 B2 | 6/2009 | Hansen et al. | |
| 7,624,069 B2 | 11/2009 | Padgette | |
| 7,689,592 B2 | 3/2010 | Denton et al. | |
| 7,716,360 B2 | 5/2010 | Angelov | |

(Continued)

FOREIGN PATENT DOCUMENTS

| | | |
|---|---|---|
| WO | WO 01/08070 A1 | 2/2001 |
| WO | WO 01/20530 A1 | 3/2001 |
| WO | WO 2008/057178 A2 | 5/2008 |
| WO | WO 2009/026589 A3 | 2/2009 |

OTHER PUBLICATIONS

Saaty, Relative Measurement and Its Generalization in Decision Making Why Pairwise Comparisons are Central in Mathematics for the Measurement of Intangible Factors the Analytic Hierarchy/Network Process, Rev. R. Acad. Cien. Serie A. Mat., vol. 102 (2), 2008, pp. 251-318.*

(Continued)

*Primary Examiner* — Wilbert L Starks
(74) *Attorney, Agent, or Firm* — Posz Law Group, PLC

(57) ABSTRACT

An apparatus includes an analytic network process (ANP) storage memory that stores an ANP weighted supermatrix representing an ANP model; and a processor in communication with the ANP storage memory. The processor is configured to facilitate measuring how alternatives synthesize with respect to a fixed node in the stored ANP weighted supermatrix to determine a perspective metric vector for the fixed node. Also, the processor maintains a same proportionality in the stored ANP weighted supermatrix for the measuring of the perspective metric vector for the fixed node.

21 Claims, 5 Drawing Sheets

(56) References Cited

U.S. PATENT DOCUMENTS

| | | | |
|---|---|---|---|
| 7,827,239 | B2 | 11/2010 | Bodin et al. |
| 7,844,670 | B2 | 11/2010 | Roskowski et al. |
| 7,996,344 | B1 | 8/2011 | Goel |
| 8,239,338 | B1 | 8/2012 | Adams et al. |
| 8,250,007 | B2 | 8/2012 | Abido et al. |
| 8,315,971 | B1 | 11/2012 | Adams et al. |
| 8,341,103 | B2 | 12/2012 | Adams et al. |
| 8,423,500 | B1 | 4/2013 | Adams et al. |
| 8,429,115 | B1 | 4/2013 | Adams et al. |
| 8,447,820 | B1 | 5/2013 | Gay |
| 2001/0027455 | A1 | 10/2001 | Abulleil et al. |
| 2003/0069868 | A1 | 4/2003 | Vos |
| 2003/0191726 | A1 | 10/2003 | Kirshenbaum |
| 2003/0208514 | A1 | 11/2003 | Yang et al. |
| 2004/0103058 | A1 | 5/2004 | Hamilton |
| 2006/0195441 | A1 | 8/2006 | Julia et al. |
| 2006/0224530 | A1 | 10/2006 | Riggs et al. |
| 2006/0241950 | A1 | 10/2006 | Hansen et al. |
| 2007/0226295 | A1 | 9/2007 | Haruna et al. |
| 2008/0103880 | A1 | 5/2008 | Saaty |
| 2008/0104058 | A1 | 5/2008 | Billmaier et al. |
| 2008/0250110 | A1 | 10/2008 | Zhao |
| 2008/0256054 | A1 | 10/2008 | Saaty |
| 2010/0153920 | A1 | 6/2010 | Bonnet |
| 2010/0318606 | A1 | 12/2010 | Sethi et al. |
| 2011/0022556 | A1 | 1/2011 | Adams et al. |
| 2012/0053973 | A1 | 3/2012 | Elazouni et al. |
| 2012/0133727 | A1 | 5/2012 | Bolduc et al. |
| 2013/0046718 | A1 | 2/2013 | Saaty et al. |

OTHER PUBLICATIONS

Notice of Allowance issued by the U.S. Patent Office on Dec. 26, 2012 in connection with related U.S. Appl. No. 12/646,289.

Notice of Allowance issued by the U.S. Patent Office on Jan. 3, 2013 in connection with related U.S. Appl. No. 12/646,312.

Notice of Allowance issued by the U.S. Patent Office on Jan. 29, 2013 in connection with related U.S. Appl. No. 13/015,754.

Office Action issued by the U.S. Patent Office on May 29, 2013 in connection with related U.S. Appl. No. 13/611,544.

U.S. Appl. No. 13/764,010, filed Feb. 11, 2013, Adams et al.

U.S. Appl. No. 13/764,810, filed Feb. 12, 2013, Adams et al.

U.S. Appl. No. 13/799,077, filed Mar. 13, 2013, Adams.

U.S. Appl. No. 13/834,461, filed Mar. 15, 2013, Saaty et al.

Buyukyazici et al. "The Analytic Hierarchy and Analytic Network Processes", Hacettepe Journal of Mathematics and Statistics, vol. 32, 2003, pp. 65-73.

Notice of Allowance issued by the U.S. Patent Office on Jun. 18, 2013 in connection with related U.S. Appl. No. 13/657,926.

Notice of Allowance issued by the U.S. Patent Office on Aug. 2, 2013 in related U.S. Appl. No. 13/290,423.

Office Action dated Aug. 1, 2013 in related U.S. Appl. No. 13/764,010.

Rafiei, et al., Project Selection Using Fuzzy Group Analytic Network Process, World Academy of Science, Engineering and Technology 34 2009, pp. 457-461.

Notice of Allowance issued by the U.S. Patent Office on Aug. 31, 2012 in connection with related U.S. Appl. No. 12/508,703.

Office Action issued by the U.S. Patent Office on Nov. 6, 2012 in connection with related U.S. Appl. No. 13/015,754.

U.S. Appl. No. 12/646,289, filed Dec. 23, 2009, Adams.

U.S. Appl. No. 12/646,312, filed Dec. 23, 2009, Adams.

U.S. Appl. No. 12/646,418, filed Dec. 23, 2009, Adams.

U.S. Appl. No. 13/015,754, filed Jan. 28, 2011, Ryan Patrick Gay.

U.S. Appl. No. 13/290,423, filed Nov. 7, 2011, Adams.

U.S. Appl. No. 13/294,369, filed Nov. 11, 2011, Adams.

Super Decisions Software for Decision Making, Super Decisions Website, (http://web.archive.org/web/20041202040911/http://www.superdecisions.com/ and http://www.superdecisions.com/~saaty/), 2004.

The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.

The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.

Decision Lens Inc., Decision Lens's Decision Lens Suite™ Product, (http://web.archive.org/web/20050204181100/www.decisionlens.com/index.php), 2004-2005.

Caterinicchia, Dan, "A problem-solving machine," *Federal Computer Week*, (Sep. 4, 2000), 14, 31, p. 48-49.

The Super Decisions Software, The Analytic Network Process, Decision Making with Dependence and Feedback, (http://www.superdecisions.com/~saaty/Fall2005DecisionClass/PowerpointSlides/), Sep. 2005.

Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.

Decision Lens, Inc., Tutorial on Hierarchical Decision Models (AHP), 2002.

Decision Lens, Inc., Tutorial on Complex Decision Models (ANP), 2002.

Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.

Rozann W. Saaty., Decision Making in Complex Environments: The Analytic Network Process (ANP) for Dependence and Feedback Including a Tutorial for the SuperDecisions Software and Portions of the Encyclicon of Application, 2005.

Decision Lens, Inc., *MS__Help__Decision__Lens*. "Welcome to Decision Lens Software™," Jun. 6, 2005.

Team Acuity, SAGD ANP Enhancement Functional Requirements Document, (Dec. 15, 2007), p. 1-68.

Decision Lens, Inc., *DLW__Help File*, Dec. 2007.

Decision Lens, Inc., *DLS__Help File*, Dec. 2007.

H. Sun., "AHP in China," International Symposium on the Analytic Hierarchy Process, (Jul. 8-10, 2003), p. 1-21.

Thomas L. Saaty., "Decision-Making with the AHP: Why is the Principal Eigenvector Necessary," International Symposium on the Analytic Hierarchy Process, (Aug. 2-4, 2001), p. 1-14.

Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.

Davolt, Steve, "The man who knew too much," *Washington Business Journal*, (Aug. 7, 2007), (http://www.bizjournals.com/washington/stories/2000/08/07/smallb1.html?t=printable).

Roxann Saaty et al., "Decision Making in complex environments," Super Decisions, 2003.

Feglar et al., "Dynamic Analytic Network Process: Improving Decision Support for Information and Communication Technology," ISAHP, Honolulu, Hawaii, (Jul. 8-10, 2003).

Borenstein et al., "A Multi-Criteria Model for the Justification of IT Investments," (Feb. 2005), INFOR v3n1, Canadian Operational Research Society, p. 1-21.

Condon et al., "Visualizing group decisions in the analytic hierarchy process," *Computers & Operation Research*, (2003), 30, p. 1435-1445.

D. Saaty et al., "The Future of the University of Pittsburgh Medical Center: Strategic Planning with the Analytic Network Process," Proceedings of the Fourth International Symposium on the Analytic Hierarchy Process, (Jul. 12-15, 1996), p. 107-121.

Liming Zhu, et al., "Tradeoff and Sensitivity Analysis in Software Architecture Evaluation Using Analytic Hierarchy Process," *Software Quality Journal*, (2005), vol. 13, pp. 357-375.

Wolfslehner, Bernhard, Vacik, Harald, Lexer, Manfred; "Application of the analytic network process in multi-criteria analysis of sustainable forest management", Forest Ecology and Management, Mar. 2005, pp. 157-170.

(56) References Cited

OTHER PUBLICATIONS

Notification of Transmittal of the International Search Report and the Written Opinion of the International Searching Authority mailed Aug. 25, 2008 in corresponding PCT application No. PCT/US2007/022184 in connection with related U.S. Appl. No. 11/586,557.

Notification of Transmittal of the International Preliminary Report on Patentability mailed May 7, 2009 in corresponding PCT application No. PCT/US2007/022184 in connection with related U.S. Appl. No. 11/586,557.

Office Action issued by the U.S. Patent Office on Aug. 5, 2008 in connection with related U.S. Appl. No. 11/586,557.

Office Action issued by the U.S. Patent Office on Apr. 14, 2009 in connection with related U.S. Appl. No. 11/586,557.

Office Action issued by the U.S. Patent Office on Apr. 13, 2009 in connection with related U.S. Appl. No. 11/783,436.

Office Action issued by the U.S. Patent Office on Oct. 21, 2009 in connection with related U.S. Appl. No. 11/783,436.

Office Action issued by the U.S. Patent Office on Mar. 15, 2012 in connection with parent U.S. Appl. No. 12/646,099.

Notice of Allowance issued by the U.S. Patent Office on Apr. 17, 2012 in connection with parent U.S. Appl. No. 12/646,099.

Demirtas et al., "An integrated multiobjective decision making process for supplier selection and order allocation", Department of Industrial Engineering, Osmangazi University, 26030 Eskisehir, Turkey, Available online Feb. 28, 2006.

Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.

Adams et al., "Super Decisions Software Guide", Copyright c 1999/2003 Thomas L. Saaty (The software for the Analytic Network Process for decision making with dependence and feedback was developed by William Adams in 1999-2003).

Neaupane et al., "Analytic network process model for landslide hazard zonation", Civil Engineering Program, Sirindhorn Int. Ins. of Technology, Thammasat University, Thailand, Available online May 2, 2008.

T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.

R.W. Saaty, "Validation Examples for the Analytic Hierarchy Process and Analytic Network Process", MCDM 2004, Whistler, B. C. Canada Aug. 6-11, 2004.

Office Action issued by the U.S. Patent Office on May 29, 2012 in connection with related U.S. Appl. No. 12/646,418.

Office Action issued by the U.S. Patent Office on Jul. 18, 2012 in connection with related U.S. Appl. No. 12/508,703.

Notice of Allowance issued by the U.S. Patent Office on Aug. 1, 2012 in connection with related U.S. Appl. No. 12/646,418.

Office Action issued by the U.S. Patent Office on Aug. 6, 2012 in connection with related U.S. Appl. No. 12/646,289.

Office Action issued by the U.S. Patent Office on Aug. 10, 2012 in connection with related U.S. Appl. No. 12/646,312.

\* cited by examiner

MEASURE HOW IMPORTANT ALT1 AND ALT2 ARE FROM THE PERSPECTIVE OF C1, WHILE TAKING INTO CONSIDERATION THE ENTIRETY OF THE NETWORK

MEASURING PERSPECTIVE OF A FACTOR IN A DECISION

CROSS-REFERENCE TO RELATED APPLICATION

This application claims the benefit of U.S. application Ser. No. 12/646,099, filed Dec. 23, 2009, titled "MEASURING PERSPECTIVE OF A FACTOR IN A DECISION," which is herein incorporated by reference in its entirety.

TECHNICAL FIELD

The present invention relates in general to measuring, and more specifically to measuring sensitivity of factors in a decision.

BACKGROUND

The factors in a decision can be represented and quantified in an analytic hierarchy process (AHP) model. The AHP model can be used to relate the factors to overall goals, and to evaluate alternative solutions. Measuring sensitivity of factors in AHP trees is generally known. As a result of the measurements of sensitivity of nodes in the tree context, a user can see how influential individual nodes are, such as how sensitive the decision model's alternative scores are to changes in weight of various nodes in the AHP tree. Measuring sensitivity of the factors in a decision can be straightforward in the AHP tree because the AHP model uses a tree structure.

The factors in a decision also can be represented and quantified in an analytic network process (ANP) model. A process of decision making using an ANP model serves to break down large decisions into smaller, manageable decisions. When a decision is represented as a typical ANP model, nodes in the ANP model can be connected to each other without regard for hierarchy level so as to represent the interrelationship between the smaller decisions. The connections that represent the effect of smaller decisions can be synthesized to arrive at the ultimate decision. Measuring sensitivity of a factor in a decision quantified in the ANP model is consequently difficult since the ANP is not a simple tree structure and a change in one factor affects interrelated decisions and may (or may not) affect the ultimate decision.

SUMMARY

Accordingly, one or more embodiments provide a method, a system, and a computer-readable storage medium, which provide for an analytic network process (ANP) storage memory that stores an ANP weighted supermatrix representing an ANP model, and a processor in communication with the ANP storage memory. In the embodiments, the processor is configured to facilitate measuring how alternatives synthesize with respect to a fixed node in the stored ANP weighted supermatrix to determine a perspective metric vector for the fixed node; and maintaining a same proportionality in the stored ANP weighted supermatrix for the measuring of the perspective metric vector for the fixed node.

According to another embodiment, the measuring of the perspective metric vector comprises pushing an overall importance of the fixed node toward a value of 1, and then synthesizing over the stored ANP weighted supermatrix.

According to still another embodiment, the pushing of the importance comprising inducing a family of ANP models by row perturbations of the fixed node in the stored ANP weighted supermatrix of plural predetermined amounts so as to take a limit as a priority of the fixed node goes toward the value of 1, the alternative score further being synthesized from alternative scores of the fixed node in the induced family of ANP models.

Yet another embodiment provides the perspective metric vector being measured consistent with at least one of the formulas:

a synthesized value of alternative i from the perspective of the fixed node r being $$p_{r,i} = \lim_{p \to 1} s_{r,i}(p); \text{ and}$$

a total synthesized vector being denoted by
$p_r = (p_{r,1}, \ldots, p_{r,a})$
A being the ANP model,
W being the weighted supermatrix of a single level of the ANP model (of dimensions n×n),
W(p) being a family of row perturbations of row $1 \le r \le n$ of W,
$s_{r,i}(p)$ being the synthesized score for alternative i for the family of ANP row perturbations of row r at parameter value p,
A(p) being the induced family of ANP models,
the ANP model having a alternatives.

According to still other embodiments, a perspective matrix is constructed for the stored ANP weighted supermatrix, giving simultaneous perspective information for plural nodes in the network using the node scores of all of the plural nodes from the perspective of the fixed node.

Still another embodiment provides an output unit in communication with the processor and configured to output, for a display to a user, the determined perspective metric vector.

Yet another embodiment provides for an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1A:
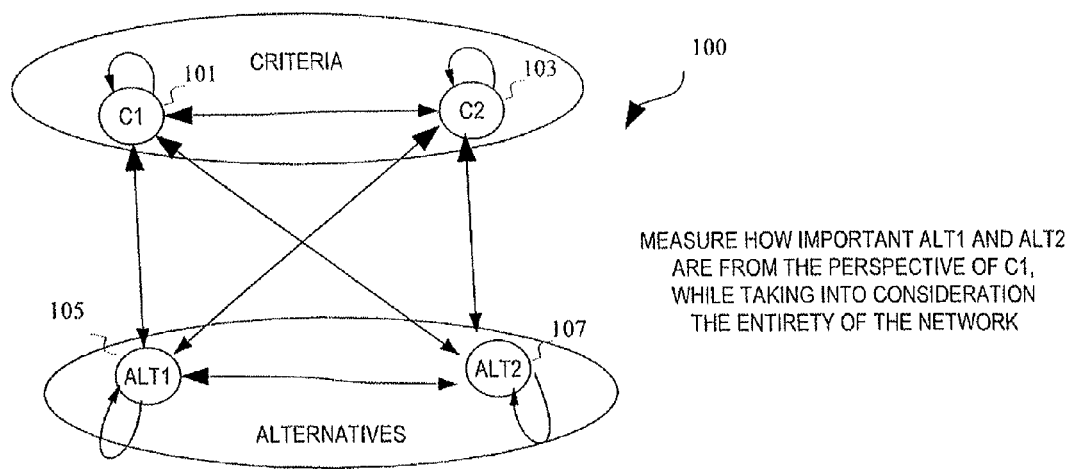
FIG. 1A is a network diagram illustrating a measurement of a perspective of a node in an ANP weighted supermatrix.

In overview, the present disclosure concerns computers, computer networks and computer systems, such as an intranet, local area network, distributed network, or the like having a capability of measuring properties of decision models. Such computer networks and computer systems may further provide services such as interacting with users, and/or evaluating modifications to a decision model. More particularly, various inventive concepts and principles are embodied in systems, devices, and methods therein related to measuring properties of an analytic network process model. It should be noted that the term device may be used interchangeably herein with computer, wireless communication unit, or the like. Examples of such devices include personal computers, general purpose computers, personal digital assistants, cellular handsets, and equivalents thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Given a node in an AHP tree, it is straightforward to see how the alternatives synthesize relative to that node, since there is no feedback. However, in ANP theory, discovering how alternatives synthesize relative to a single node is a difficult task. The straightforward method of simply synthesizing relative to that node gives the same answer for all nodes (and thus no particularly interesting perspective of a given node). Using ANP row sensitivity as developed in Applicants' application titled "MEASURING SENSITIVITY OF A FACTOR IN A DECISION", Ser. No. 12/646,289, filed concurrently herewith, expressly incorporated herein by reference, we develop a method of ANP Perspective analysis which simulates the AHP situation.

1 Perspective Analysis

In AHP theory it is a simple application of the standard calculation to see how the alternatives of a model synthesize relative to a given node in the model. Unfortunately, if we carry this idea forward to ANP theory, every node gives the same perspective (in most models). This is because the limit matrix calculation results in a matrix with identical columns (again in most models). Thus, if we are to gain a useful perspective of how the alternatives synthesize with respect to a given node, something else must be done. We can use ANP Row Sensitivity to do this.

The idea is to push the overall importance of the given node towards one in the ANP model (using ANP row sensitivity), and then synthesize the alternatives, which finds where the alternatives converge to as the weight of the given node approaches one.

As the importance approaches one we get closer to the perspective of the given node. This calculation idea can work in the AHP case as well, giving the same values one would expect from the standard method of perspective analysis utilized in the AHP case.

Before starting, we review the concepts of ANP Row Sensitivity.

1.1 ANP Row Sensitivity Review

The following is a brief review of the concepts involved in ANP Row Sensitivity. Applicants' application titled "MEASURING SENSITIVITY OF A FACTOR IN A DECISION". A purpose of ANP row sensitivity is to change the numerical information for a given node in a way that is consistent with the ANP structure, and then to recalculate the alternative values (much as tree sensitivity works). We do this by having a single parameter p that is between zero and one, which represents the importance of the given node. There is a parameter value $p_0$ (called the fixed point) which represents returning the node values to the original weights. For parameter values larger than $p_0$ the importance of the node goes up, and for parameter values less than $p_0$ the importance of the node goes down. Once the parameter is set, this updates values in the weighted supermatrix (although it can also be done with the unscaled supermatrix, working by clusters instead) and re-synthesizes. There is essentially one way to do this calculation and preserve the ANP structure of the model. In the notation of that application, let W be the weighted supermatrix of a single level of our model, ANP row sensitivity constructs a family of row perturbations of W. A family of row perturbations of W is a mapping $f:[0,1] \to M_{a,n}([0,1])$ that gives a weighted supermatrix f(p) for each parameter value $p \in [0,1]$. This mapping must preserve the ANP structure of our original supermatrix. The only real choice is what to make our fixed point $p_0$. Once we have chosen that, the standard formula for the family of row perturbations of row r of W preserving the ANP structure is labeled $F_{W,r,p_0}:[0,1] \to M_{n,a}([0,1])$ and is defined in the following way.

1. Leave trivial columns unchanged. A trivial column is defined herein as either a zero column, or a column with all zeroes except one entry that is one.

2. If $0 \le p \le p_0$ define $F_{W,r,p_0}(p)$ by scaling the $r^{th}$ row by $$\frac{p}{p_0}$$

and scaling the other entries in the columns so as to keep the matrix stochastic.

3. If $p_0 \le p \le 1$ define $F_{W,r,p_0}(p)$ by leaving alone columns of W for which $W_{r,i}=0$ and scaling all entries in the other columns, except for the entry in the $r^{th}$ row, by $$\frac{1-p}{1-p_0}$$

(and change the entry in that $r^{th}$ row so as to keep the matrix stochastic).

1.2 Definition

Definition 1 (Ranking). Let A be an ANP model with a alternatives ordered.

We use the following notation for standard calculated values of the model.

$s_{A,i}$=synthesized score for alternative i $r_{A,j}$=ranking of alternative i where 1=best, 2=second best, etc.

Definition 2 (Family of ANP models induced by row perturbations). Let A be an ANP model, W be the weighted supermatrix of a single level of it (of dimensions n×n) and let W(p) be a family of row perturbations of row $1 \le r \le n$ of W. We can think of this as inducing a family of ANP models, which we denote by A (p). For the synthesized score of alternative i in the ANP model A (p) we write either $s_{A(p),i}$ or if the original model and family is understood from context we write instead $s_i(p)$.

If we wish to emphasize that we have a family of row perturbations of row r we write instead $s_{r,i}(p)$.

Definition 3 (ANP Perspective Analysis). Let A be an ANP model, W be the weighted supermatrix of a single level of it (of dimensions n×n), let W(p) be a family of row perturbations of row $1 \le r \le n$ of W, and A (p) be the induced family of ANP models. Finally let the model have a alternatives. We define the synthesized value of alternative i from the perspective of node r to be $$p_{r,i} = \lim_{p \to 1} s_{r,i}(p).$$

The total synthesized vector we denote by $p_r=(p_{r,i}, \ldots, P_{r,a})$.

Note 1. Although this definition appears to depend on the family W(p) at first sight, it does not. By virtue of the definition of a family of row perturbations, all such perturbations will give rise to the same limiting value.

1.3 Calculating

Calculating these perspective values amounts to a standard limit calculation, with one caveat. If we let the value get too close to 1 for some models two problems occur.

1. The convergence of the limit matrix takes longer and longer the closer to one we get. Thus we need to balance calculation complexity against accuracy.

2. Round off errors can complicate the calculations.

Therefore, we cannot blindly plug in values arbitrarily close to one, expecting to reach a limit calculation every time, at least using the standard precision mathematics available in languages like C and Java (doubles). However, we can alleviate the problem of round off error by using a conventionally available library like libgmp, which allows for arbitrary precision arithmetic. The cost of such a library is two-fold.

First we can write our calculations to utilize arbitrary-precision arithmetic, for example, libgmp, and secondly arbitrary precision arithmetic comes at a fairly high calculation cost (causing the limit matrix calculation time to grow). However, if we are willing to put up with long calculation times we can find the limit simply by plugging in numbers closer and closer to one using arbitrary precision numbers. If we are not willing to accept long computation times (in the BigBurger model on a workstation it takes less than a minute) we can plug in a number as close to one as we wish, and accept that as the limit. However, when using this method, we also pick a number closer to one, and compare the two results, reporting back the distance between these results (so that we have some sense of the error involved in merely picking a single number to approximate a limit). What number one picks to plug in is highly dependent upon the model in question. If we pick a number too close to one, while using the standard double data type, round off errors can result in an incorrect calculation, as well as making it more time consumptive. If we pick a number too far from one, we have error introduced by that as well. Thus using this particular method to approximate the limit is more art than science, and should be thought of as a last resort for a model taking too long to accomplish the standard limit algorithm.

2 Perspective Analysis Examples

The following examples were calculated using software implementing the limit calculation (versus the brute force method of plugging in a single value). There are various parameters involved in this limit. They are the following.

StartH: This value tells us what the initial value we plug in to the limit calculation. The initial value is 1−StartH. That is StartH is how far away from 1 we start the limit process.

MaxError: This specifies the maximum distance between consecutive values in the limiting process we allow before we consider the limit arrived at (i.e. that we have converged to the limiting value).

MaxSteps: This is the maximum number of values we will plug in to the limit calculation before we give up. If convergence does not occur within this number of steps a convergence error is returned.

Metric: There are many ways to calculate the distance between consecutive results (the results are the synthesized values of the alternatives, thus a vector).

Also note, between each step, we half the distance from 1 the value we plugin is. Thus if StartH=0.02, the values of p we plug in for the limit are the following.

0.98, 0.99, 0.995, 0.9975; ...

(each time we are halving the distance from 1).

2.1 4Node2.mod

This is a model with two clusters (a criteria cluster and alternatives cluster) each of which contain two nodes (two criteria "A" and "B" and two alternatives "1" and "2"). All nodes are connected to one another with pairwise comparison data inputted.

The inputs in this example used for the algorithm are the following.

StartH=0.001
MaxSteps=50
MaxError=1e-5
Metric=0 that is, the standard Euclidean metric.

TABLE 1

| Node | Param | Distance | Normal 1 | Normal 2 | Error |
|---|---|---|---|---|---|
| Original Values | 0.5000000 | 0.0000 | 0.39 | 0.61 | 0.000000 |
| A | 0.9999840 | 9.6101 | 0.67 | 0.33 | 0.000008 |
| B | 0.9999840 | .5393 | 0.1 | 0.9 | 0.000010 |
| 1 | 0.9999840 | 1.0593 | 1 | 0 | 0.000010 |
| 2 | 0.9999840 | 0.6504 | 0 | 1 | 0.000007 |

The rows in Table 1 represent the ANP Perspective of each node in the model (except the first row which is the original synthesis results). The first column is the node name, the second is the parameter value at which convergence occurred, the third is the distance the newly synthesized results were from the initial values (in the first row), the fourth and fifth columns are the synthesized values for alternative "1" and "2" respectively, and the last column is the error we found during convergence.

Notice that from the perspective of node "1" (which is also an alternative) alternative "1" scores perfectly. This makes sense, since we are pushing up the priority of node "1" towards 1.0. Likewise for node "2"'s perspective, alternative "2" scores perfectly. These are rather boring results, but the rows for "A" and "B" yield something more interesting. From node "A"'s perspective, alternative "1" gets a score of 0.67 and alternative "2" gets a score of 0.33 (Interestingly enough, this is the local priorities of "1" and "2" with respect to node "A". This happens in some cases (in the BigBurger model which follows many of nodes have this property, but not all).) For node "B" the same thing occurs—its perspective yields the local weights of alternatives "1" and "2".

2.2 BigBurger.mod

The initial values are from the standard example model included with SuperDecisions. The results of perspective measurement are as follows in Table 2.

TABLE 2

| Node | Dist | McD | BK | Wendy's | Local Diff |
|---|---|---|---|---|---|
| Original Values | 0 | 0.634 | 0.233 | 0.133 | |
| 1 Subs | 1.01 | 0.333 | 0.333 | 0.333 | 0 |
| 5 Drive Thru | 0.26 | 0.807 | 0.107 | 0.087 | 0.37 |
| 2 Recycling | 0.19 | 0.766 | 0.165 | 0.069 | 0.01 |
| 1 White Collar | 0.18 | 0.756 | 0.188 | 0.056 | 0 |
| 3 Students | 0.16 | 0.735 | 0.207 | 0.058 | 0 |
| 2 Blue Collar | 0.16 | 0.735 | 0.207 | 0.058 | 0 |
| 1 Personnel | 0.15 | 0.733 | 0.188 | 0.079 | 0.02 |
| 2 Food Hygiene | 0.15 | 0.731 | 0.188 | 0.081 | 0 |
| 3 Waste Disposal | 0.15 | 0.729 | 0.189 | 0.081 | 0 |
| 1 Nutrition | 0.13 | 0.717 | 0.205 | 0.078 | 0 |
| 4 Families | 0.12 | 0.699 | 0.237 | 0.064 | 0 |
| 3 Location | 0.11 | 0.705 | 0.211 | 0.084 | 0 |
| 2 Product | 0.11 | 0.705 | 0.211 | 0.084 | 0 |
| 3 Parking | 0.11 | 0.705 | 0.208 | 0.087 | 1 |
| 2 Chicken | 0.11 | 0.701 | 0.193 | 0.106 | 0 |
| 1 Price | 0.11 | 0.699 | 0.220 | 0.081 | 0.02 |
| 2 Seating | 0.11 | 0.700 | 0.212 | 0.088 | 1 |
| 4 Over Packaging | 0.1 | 0.697 | 0.213 | 0.091 | 0.01 |
| 4 Deals | 0.09 | 0.692 | 0.216 | 0.092 | 0 |
| 3 Site Hygiene | 0.07 | 0.675 | 0.217 | 0.108 | 0.02 |
| 3 Pizza | 0.07 | 0.673 | 0.226 | 0.101 | 0 |
| 5 Chinese | 0.07 | 0.673 | 0.226 | 0.101 | 0 |
| 7 Diners | 0.07 | 0.619 | 0.265 | 0.115 | 0.01 |
| 1 Speed of Service | 0.02 | 0.626 | 0.238 | 0.136 | 0 |
| 6 Steak | 0.02 | 0.626 | 0.238 | 0.136 | 0 |
| 4 Mexican | 0.02 | 0.626 | 0.238 | 0.136 | 0 |
| 4 Delivery | 0.02 | 0.625 | 0.237 | 0.137 | 1 |
| 1 Short Term | 0.01 | 0.630 | 0.235 | 0.134 | 0.06 |
| 2 Medium Term | 0 | 0.634 | 0.234 | 0.133 | 0.12 |

We have skipped the parameter column, as well as error column in this example (they do not tell anything interesting).

However we have added a "Local Diff" column. This is the distance the ANP perspective for the given node was from its local weights for the alternatives. We notice that all but a few nodes have their ANP Perspective the same as their local weights. However "5 Drive Thru" and "2 Medium Term" both give something different for their perspective.

2.3 DiLeo

This is a model pulled from the Saaty's class on ANP modeling. It attempts to find the market share of various beer producers. The data reported in Table 3 below is sorted by maximum percent difference.

TABLE 3

| Node | % Diff | Dist | Busch | Coors | Other | Miller | Local Diff |
|---|---|---|---|---|---|---|---|
| Original | 0 | 0 | 0.43 | 0.16 | 0.2 | 0.2 | |
| Customers | 1.16 | 0.77 | 0.2 | 0.22 | 0.43 | 0.15 | 0.2 |
| Price | 1.16 | 0.74 | 0.24 | 0.22 | 0.31 | 0.23 | 0.51 |
| Quality | 1.16 | 0.96 | 0.13 | 0.25 | 0.5 | 0.13 | 0 |
| Avail. | 1.14 | 0.64 | 0.38 | 0.19 | 0.05 | 0.38 | 0 |
| Ad Spend | 0.1 | 0.46 | 0.64 | 0.11 | 0.06 | 0.2 | 0 |
| Appeal | 0.6 | 0.3 | 0.37 | 0.17 | 0.27 | 0.19 | 0.62 |
| Freq Ads | 0.41 | 0.22 | 0.51 | 0.14 | 0.14 | 0.21 | 0.28 |
| Style | 0.39 | 0.19 | 0.39 | 0.15 | 0.25 | 0.21 | 0.41 |
| Creat. Ads | 0.39 | 0.2 | 0.49 | 0.14 | 0.14 | 0.22 | 0.62 |
| Brand Rec. | 0.35 | 0.18 | 0.49 | 0.15 | 0.15 | 0.22 | 0.31 |
| Ad Location | 0 | 0 | 0.43 | 0.16 | 0.2 | 0.2 | 0.27 |
| Promotion | 0 | 0 | 0.43 | 0.16 | 0.2 | 0.2 | 0.62 |
| Taste | 0 | 0 | 0.43 | 0.16 | 0.2 | 0.2 | 0.94 |

Notice that only three of these nodes have a local diff of zero (meaning that the ANP Perspective analysis for that node simply gave the local weights). If we consider the rankings of the nodes obtained from marginal influence and from rank influence we find that there is much similarity to this ordering, although there are a few differences.

3 Perspective Matrix

In a similar vein to ANP Perspective analysis, we can construct a Perspective matrix, giving the perspective information for all nodes in the network. However for the Perspective matrix, we do not simply look at the synthesized alternative scores, but the scores of all of the nodes from the perspective of the given node (including the score of the node itself, relative to itself which is tricky, as we will see).

3.1 Definition of Perspective Matrix

Definition 4 (Perspective Column). Let A be an ANP model, W be the weighted supermatrix of a single level of it (of dimensions n×n), let $W_r(p)$ be a family of row perturbations of row $1 \leq r \leq n$ of W. Let $L_{W_r}(p)$ be the limit matrix of $W_r(p)$. We define $\overline{L_{W_r}}(p)$ to be $L_{W_r}(p)$ with the diagonal replaced with zeros and the columns renormalized. Then we define $$\overline{L_{W_r}} = \lim_{p \to 1^-} \overline{L_{W_r}}(p)$$

Next we define the $r^{th}$ perspective column $P_{W,r}$ to be the $r^{th}$ column of $\overline{L_{W_r}}$. Lastly we define the self-adjusted $r^{th}$ perspective column (denote by $\overline{P_{W,r}}$) by the following steps.

1. Renormalize $P_{W,r}$ to sum to $1-W_{r,r}$.
2. Next replace the $r^{th}$ entry by $W_{r,r}$.

Definition 5 (Perspective Matrix). Let A be an ANP model, W be the weighted supermatrix of a single level of it (of dimensions n×n), let $W_r(p)$ be families of row perturbations of W for each row between 1 and n. The perspective matrix of W is denoted by $P_W$ and its $i^{th}$ column is $P_{W,i}$. Likewise the self-adjusted perspective matrix of W is denoted by $\overline{P_W}$ and its $i^{th}$ column is $\overline{P_{W,i}}$.

3.2 Discussion of Relation to Hierarchies

In hierarchies it can be a straightforward exercise to define a perspective matrix (and perspective analysis of the alternatives) without resorting to the complexities of ANP perspective analysis discussed herein. We simply synthesize from the given node in the tree and have our answer. The question is, how does this idea of hierarchy perspective analysis relate to ANP perspective analysis? The answer is the results of the ANP perspective matrix, when applied to AHP trees, agrees with AHP perspective matrix calculations using AHP only techniques. However, the ANP perspective results apply to a much larger domain.

3.3 Perspective Matrix Examples

The following are some standard models that we have applied Perspective Matrix Analysis to. For each one we describe the results and anything of interest in the calculations themselves.

3.3.1 4Node2.mod

This model has two clusters, "A1 criteria" and "Alternatives". There are two criteria "A" and "B", and two alternatives "1" and "2". All nodes are connected to each other, and the weighted supermatrix is as follows (the ordering of nodes in the supermatrix is "A", "B", "1", "2").

$$W = \begin{bmatrix} 0.3750 & 0.2000 & 0.0500 & 0.3333 \\ 0.1250 & 0.3000 & 0.4500 & 0.1667 \\ 0.3333 & 0.0500 & 0.2750 & 0.1500 \\ 0.1667 & 0.4500 & 0.2250 & 0.3500 \end{bmatrix}$$

The resulting perspective analysis table follows, in Table 4.

TABLE 4

|   | A | B | 1 | 2 |
|---|---|---|---|---|
| A | 0.00000 | 0.28752 | 0.06896 | 0.51281 |
| B | 0.20000 | 0.00000 | 0.62069 | 0.25641 |
| 1 | 0.53333 | 0.07142 | 0.00000 | 0.23078 |
| 2 | 0.26667 | 0.64286 | 0.31035 | 0.00000 |

Likewise, if we normalize by cluster, as in Table 5, we see something interesting.

TABLE 5

|   | A | B | 1 | 2 |
|---|---|---|---|---|
| A | 0 | 1 | 0.1 | 0.67 |
| B | 1 | 0 | 0.9 | 0.33 |
| 1 | 0.67 | 0.1 | 0 | 1 |
| 2 | 0.33 | 0.9 | 1 | 0 |

Notice that for each column the priorities of the nodes in the other cluster are the same as the local priorities. This happens for some columns in many models. However, it certainly is not the rule (rather the exception).

3.3.2 BigBurger

This is the standard BigBurger model that ships in the sample models of SuperDecisions. There are 32 nodes in this model, and thus too many to effectively show the entirety of the perspective matrix. Instead we show a few of the most interesting columns from this matrix and describe what they are telling us. There are several ways to decide what makes interesting columns. For instance we could see how far away the perspective matrix is from the weighted supermatrix (how far the perspective is away from the original weights). On the other hand we could see how far the perspective matrix is from the limit matrix (how far the perspective is from the global perspective).

First, in Table 6, let us look at the columns of the perspective matrix that differ most from the weighted supermatrix.

TABLE 6

|   | Sh Term | Med Term | Seating | Parking | Drive Thru |
|---|---------|----------|---------|---------|------------|
| 1 McDonalds | 0.133 | 0.134 | 0.083 | 0.028 | 0.187 |
| 2 Burger King | 0.050 | 0.049 | 0.025 | 0.008 | 0.025 |
| 3 Wendy's | 0.027 | 0.028 | 0.010 | 0.003 | 0.020 |
| 1 White Collar | 0.041 | 0.041 | 0.028 | 0.011 | 0.069 |
| 2 Blue Collar | 0.030 | 0.030 | 0.039 | 0.008 | 0.044 |
| 3 Students | 0.030 | 0.030 | 0.045 | 0.004 | 0.046 |
| 4 Families | 0.064 | 0.064 | 0.025 | 0.018 | 0.074 |
| 1 Price | 0.044 | 0.044 | 0.017 | 0.027 | 0.039 |
| 2 Product | 0.063 | 0.064 | 0.089 | 0.143 | 0.042 |
| 3 Location | 0.038 | 0.038 | 0.294 | 0.399 | 0.113 |
| 4 Deals | 0.031 | 0.031 | 0.000 | 0.000 | 0.003 |
| 1 Nutrition | 0.040 | 0.040 | 0.009 | 0.015 | 0.020 |
| 2 Recycling | 0.012 | 0.012 | 0.000 | 0.000 | 0.005 |
| 3 Waste Disp | 0.008 | 0.008 | 0.000 | 0.000 | 0.002 |
| 4 Over Pkg | 0.009 | 0.009 | 0.000 | 0.000 | 0.003 |
| 1 Personnel | 0.061 | 0.061 | 0.007 | 0.011 | 0.026 |
| 2 Food Hyg | 0.049 | 0.049 | 0.011 | 0.017 | 0.020 |
| 3 Site Hyg | 0.033 | 0.033 | 0.003 | 0.004 | 0.011 |
| 1 Spd of Ser | 0.028 | 0.028 | 0.034 | 0.011 | 0.032 |
| 2 Seating | 0.015 | 0.015 | 0.000 | 0.000 | 0.021 |
| 3 Parking | 0.012 | 0.012 | 0.075 | 0.000 | 0.019 |
| 4 Delivery | 0.012 | 0.012 | 0.066 | 0.133 | 0.017 |
| 5 Drive Thru | 0.011 | 0.011 | 0.059 | 0.133 | 0.000 |
| 1 Subs | 0.024 | 0.024 | 0.008 | 0.003 | 0.027 |
| 2 Chicken | 0.024 | 0.024 | 0.008 | 0.004 | 0.024 |
| 3 Pizza | 0.031 | 0.031 | 0.011 | 0.004 | 0.032 |
| 4 Mexican | 0.018 | 0.018 | 0.007 | 0.003 | 0.023 |
| 5 Chinese | 0.021 | 0.021 | 0.013 | 0.005 | 0.020 |
| 6 Steak | 0.021 | 0.021 | 0.019 | 0.005 | 0.020 |
| 7 Diners | 0.018 | 0.018 | 0.016 | 0.001 | 0.019 |
| 1 Short Term | 0.000 | 0.000 | 0.000 | 0.000 | 0.000 |
| 2 Med Term | 0.000 | 0.000 | 0.000 | 0.000 | 0.000 |

There are a few interesting things to note about these columns in Table 6. The first two columns essentially are the limit priorities (meaning that they have no difference with the limit matrix). The other three all come from the cluster "6 Traits". Next let us consider the perspective matrix columns with the largest difference with the global perspective, shown in Table 7. They are the following.

TABLE 7

|   | Parking | Delivery | Seating | Location | Food Hyg |
|---|---------|----------|---------|----------|----------|
| 1 McDonalds | 0.028 | 0.028 | 0.083 | 0.210 | 0.199 |
| 2 Burger King | 0.008 | 0.010 | 0.025 | 0.063 | 0.051 |
| 3 Wendy's | 0.003 | 0.006 | 0.010 | 0.025 | 0.022 |
| 1 White Collar | 0.011 | 0.097 | 0.028 | 0.061 | 0.051 |
| 2 Blue Collar | 0.008 | 0.094 | 0.039 | 0.112 | 0.017 |
| 3 Students | 0.004 | 0.094 | 0.045 | 0.138 | 0.017 |
| 4 Families | 0.018 | 0.103 | 0.025 | 0.043 | 0.106 |
| 1 Price | 0.027 | 0.062 | 0.017 | 0.000 | 0.000 |
| 2 Product | 0.143 | 0.041 | 0.089 | 0.000 | 0.172 |
| 3 Location | 0.399 | 0.174 | 0.294 | 0.000 | 0.000 |
| 4 Deals | 0.000 | 0.060 | 0.000 | 0.000 | 0.000 |
| 1 Nutrition | 0.015 | 0.014 | 0.009 | 0.000 | 0.000 |
| 2 Recycling | 0.000 | 0.001 | 0.000 | 0.000 | 0.000 |
| 3 Waste Disp | 0.000 | 0.000 | 0.000 | 0.000 | 0.000 |
| 4 Over Pkg | 0.000 | 0.001 | 0.000 | 0.000 | 0.000 |
| 1 Personnel | 0.011 | 0.008 | 0.007 | 0.000 | 0.241 |

TABLE 7-continued

|  | Parking | Delivery | Seating | Location | Food Hyg |
|---|---|---|---|---|---|
| 2 Food Hyg | 0.017 | 0.008 | 0.011 | 0.000 | 0.000 |
| 3 Site Hyg | 0.004 | 0.003 | 0.003 | 0.000 | 0.000 |
| 1 Spd of Ser | 0.011 | 0.029 | 0.034 | 0.000 | 0.000 |
| 2 Seating | 0.000 | 0.034 | 0.000 | 0.000 | 0.000 |
| 3 Parking | 0.000 | 0.073 | 0.075 | 0.034 | 0.000 |
| 4 Delivery | 0.133 | 0.000 | 0.066 | 0.077 | 0.000 |
| 5 Drive Thru | 0.133 | 0.024 | 0.059 | 0.029 | 0.000 |
| 1 Subs | 0.003 | 0.004 | 0.008 | 0.020 | 0.035 |
| 2 Chicken | 0.004 | 0.004 | 0.008 | 0.015 | 0.018 |
| 3 Pizza | 0.004 | 0.006 | 0.011 | 0.027 | 0.040 |
| 4 Mexican | 0.003 | 0.004 | 0.007 | 0.014 | 0.007 |
| 5 Chinese | 0.005 | 0.004 | 0.013 | 0.033 | 0.006 |
| 6 Steak | 0.005 | 0.005 | 0.019 | 0.050 | 0.006 |
| 7 Diners | 0.001 | 0.004 | 0.016 | 0.050 | 0.010 |
| 1 Short Term | 0.000 | 0.002 | 0.000 | 0.000 | 0.000 |
| 2 Med Term | 0.000 | 0.002 | 0.000 | 0.000 | 0.000 |

Notice again that the cluster "6 Traits" has nodes showing up.

Referring now to FIG. 1A, a network diagram illustrating a measurement of a perspective of a node in an ANP weighted supermatrix will be discussed and described. Also, reference will be made to FIG. 1B, a block diagram used for explaining FIG. 1A. In FIG. 1A, there are illustrated criteria C1 and C2 101, 103, and alternatives ALT1 and ALT2 105, 107, both in an ANP network 100.

A goal in the illustrated example is to measure how important ALT1 and ALT2 105, 107 are from the perspective of node C 101, while taking into consideration the entirety of the ANP network. Assume that the initial synthesized scores in this example are ALT1=0.85 and ALT2=0.33, which are values which were calculated from input to the decision model 100, according to known techniques.

To measure how important ALT1 and ALT2 105, 107 are from the perspective of C1, we use ANP row sensitivity on the row for criteria C1 and move values of p closer and closer to one, and see what limiting values the synthesized scores for the alternatives approach.

Figure 1B:
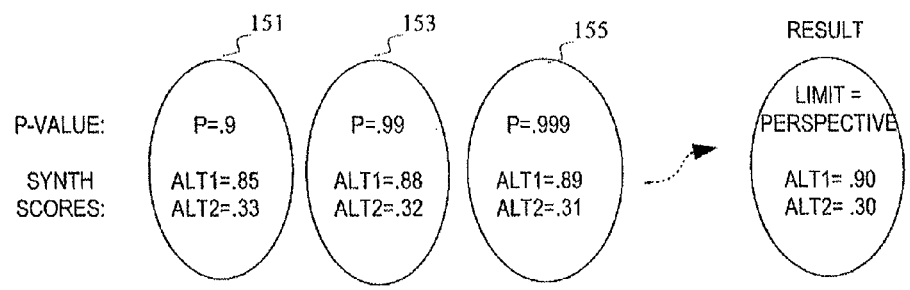
FIG. 1B is a block diagram used for explaining FIG. 1A.

As shown in FIG. 1B, as the value of p approaches one, the synthesized alternative scores for ALT1 and ALT2 using ANP row sensitivity on C1 are calculated. The result of the perspective measurement for C1 is that, as p approaches 1, ALT1 is measured at 0.90, and ALT2 is measured at 0.30. This means that, from the perspective of node C1 (i.e., from the perspective of criteria C1), alternative ALT1 measures three times as important as alternative ALT2, and ALT2 scores 90% from perfect, within the ANP network 100.

Figure 2:
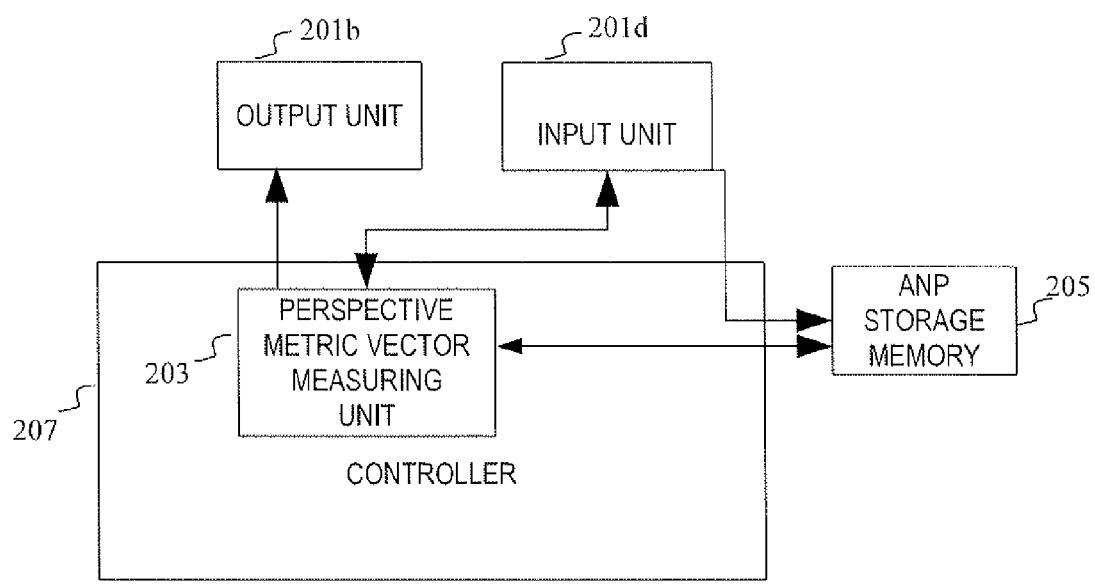
FIG. 2 a block diagram illustrating a system for measuring a perspective.

Referring now to FIG. 2, a block diagram illustrating a system for measuring a perspective will be discussed and described. In the illustrated embodiment, there is provided a controller 207, with a perspective measuring unit 203. The perspective measuring unit 203 can access an ANP storage memory 205, in order to measure perspective of nodes in the ANP model in the ANP storage memory 205. Users can interact via an output unit 201b and/or an input unit 201d with the perspective measuring unit 203. Also, users can interact via an input unit 201d with the ANP model stored in the ANP storage memory 205, for example where votes for the ANP model (which can represent votes) are input via the input unit 201d. The output unit 201b and/or input unit 201d can be remote or local.

Figure 3:
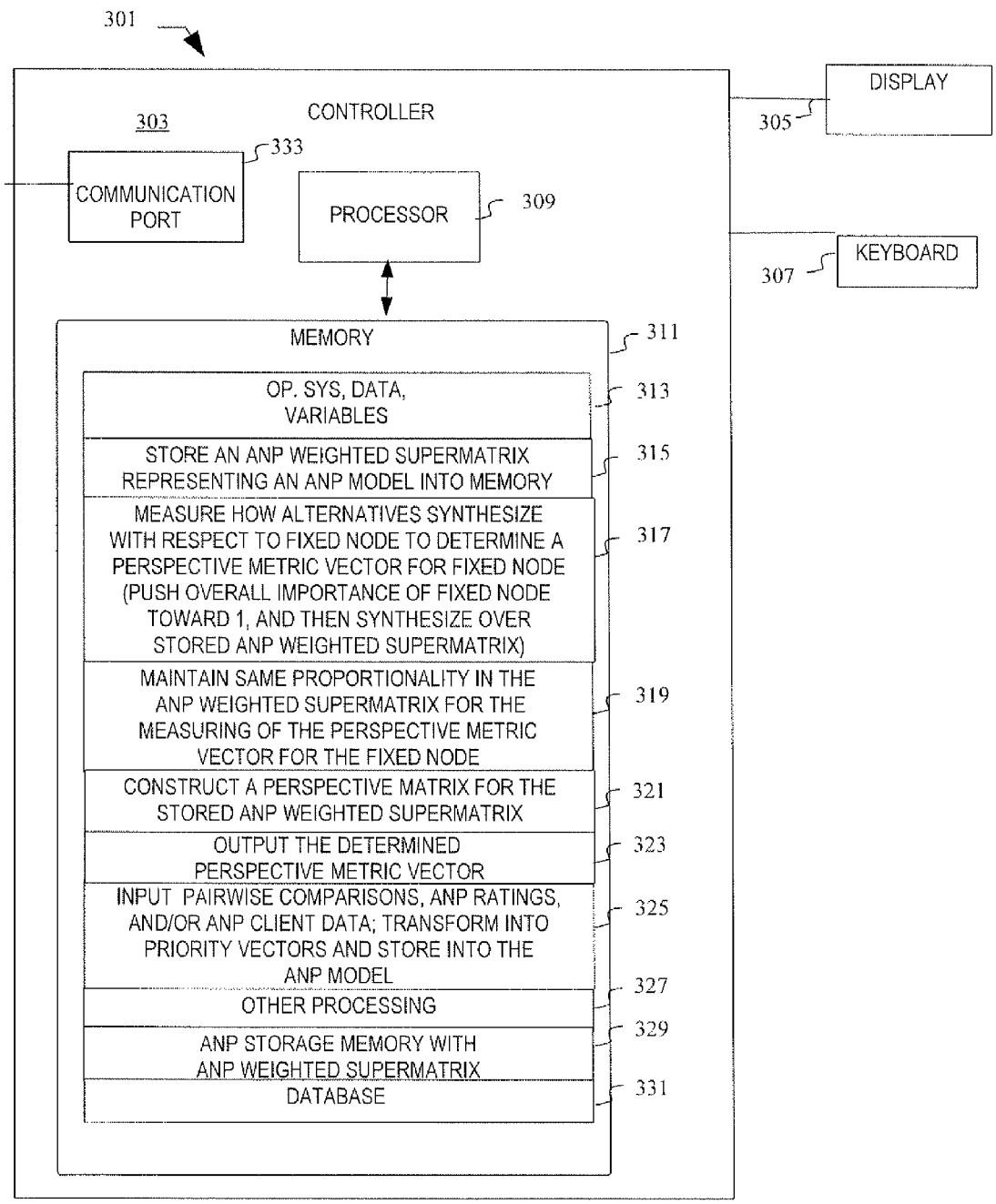
FIG. 3 is a block diagram illustrating portions of an exemplary computer.

Referring now to FIG. 3, a block diagram illustrating portions of an exemplary computer will be discussed and described. The computer 301 may include an optional communication port 333 for communication with an external device (not illustrated), a processor 309, a memory 311, a display 305, and/or a user input device 307, e.g., a keyboard (as illustrated), trackball, mouse, or known voting device. Many of the other elements of a computer are omitted but will be well understood to one of skill in the art.

The processor 309 may comprise one or more microprocessors and/or one or more digital signal processors. The memory 311 may be coupled to the processor 309 and may comprise a read-only memory (ROM), a random-access memory (RAM), a programmable ROM (PROM), and/or an electrically erasable read-only memory (EEPROM). The memory 311 may include multiple memory locations for storing, among other things, an operating system, data and variables 313 for programs executed by the processor 309; computer programs for causing the processor to operate in connection with various functions such as to store 315 an ANP weighted supermatrix representing an ANP model into memory, to measure 317 how alternatives synthesize with respect to a fixed node to determine a perspective metric vector for the fixed node, to maintain 319 the same proportionality in the ANP weighted supermatrix while the perspective metric vector is being measured, to construct 321a perspective matrix for the stored ANP weighted supermatrix, to output 323 the perspective metric vector which was determined, to input 325 various data into the ANP model, and/or other processing 325; the ANP storage memory 327 in which the ANP weighted supermatrix is stored; and a database 329 for other information used by the processor 309. The computer programs may be stored, for example, in ROM or PROM and may direct the processor 309 in controlling the operation of the computer 301.

The user may invoke functions accessible through the user input device 307. The user input device 307 may comprise one or more of various known input devices, such as a keypad, a computer mouse, a touchpad, a touch screen, a trackball, a keyboard and/or a button device configured to register votes. Responsive to signaling received from the user input device 307, in accordance with instructions stored in memory 311, or automatically upon receipt of certain information via the communication port 333, the processor 309 may direct information in storage or information received by the user input device to be processed by the instructions stored in memory 311.

The display 305 may present information to the user by way of a text and/or image display 305 upon which information may be displayed. The display 305 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 309 can be programmed to store 315 an ANP weighted supermatrix representing an ANP model into memory. Before storing the ANP weighted supermatrix, values in the ANP weighted supermatrix can be obtained from an ANP model, for example, by inputting pairwise comparisons and creating an ANP weighted supermatrix therefrom, through various known techniques. An ANP weighted supermatrix representing the ANP model which is created can be generated, and the ANP supermatrix and/or the ANP model can be stored in memory. The memory can be local as illustrated (e.g., ANP storage memory with ANP weighted supermatrix), or can be remote if preferred.

The processor 309 can be programmed to measure 317 how alternatives synthesize with respect to a fixed node to determine a perspective metric vector for the fixed node. This was previously discussed in detail, and will not be repeated here.

The processor 309 can be programmed to maintain 319 the same proportionality in the ANP weighted supermatrix while the perspective metric vector is being measured and changes to approach one. The same proportionality is maintained while preserving the ANP structure. The proportionality is maintained throughout the entire ANP network.

To preserve the ANP structure, connections are not created or destroyed. That is, an entry in the matrix is not changed to or from zero, since a non-zero value represents a connection whereas a zero value indicates that there is no connection.

Preserving proportionality is a more difficult consideration. So, the question is, if I am making changes to this row, what is the most proportionality I can keep?Hence, maintaining proportionality is the more difficult and/or subtle problem for figuring out how this should behave.

No connections in the ANP network are created or destroyed by doing this present process. If a priority is zero, then there is no connection to another node. If that is ever changed from zero to something, then a connection has been created by the system, which is bad because the user did not create the connection. The change from zero changes the ANP structure because it creates a connection that was not there originally. Likewise, taking a non-zero value (which is a connection) and changing it to zero deletes a connection which was there. An embodiment of the present process does not create or destroy connection.

Now consider how to preserve as much of proportionality as possible, that is, preserving the ratios of the numbers involved in the ANP model as possible. If, in the original ANP model, e.g., node A is twice as good as node B, that proportionality is maintained as much as possible. It cannot be kept exactly, because that means nothing can be changed. However, by doing row sensitivity, you will break a few proportionalities. There is no choice. But, the other proportionalities you want to keep.

That is, to keep proportionality while changing a node to test that node, you are attempting to maintain proportionality for the other non-changed nodes. Proportionality involves a node and a with-respect-to, and you want to preserve those proportionalities as much as possible.

While maintaining proportionality, trivial columns are not changed. That is, an entry in the ANP model that is not connected, stays that way; or something that is only connected to itself, stays that way. While maintaining proportionality, connections are not created, and connections are not destroyed. To summarize, in order to preserve ANP structure, connections are not created or destroyed.

The processor 309 can be programmed to construct 321*a* perspective matrix for the stored ANP weighted supermatrix. This was previously discussed in detail, and will not be repeated here.

The processor 309 can be programmed to output 323 the perspective metric vector which was determined. That is, an indication of the determined perspective metric vector can be visually displayed for a user. For example, the numerical value(s) for the nodes for the perspective matrix can be presented to the user, or a chart can be provided showing the perspective metric vectors of one or more nodes in the ANP model. By such a measurement, a user can identify the importance of both nodes and alternatives with respect to a particular criteria so as to further understand the effect of that criteria to the overall model. The user can also see how important the alternatives are to a given node (for instance if the user wants to focus on political risks he can look at the perspective calculation for political risks.) The user can also see how individual nodes contribute to the overall decision, in a way that is not possible with known techniques.

The processor 309 can be programmed to interact with the user so as to input 325 new or modified pairwise comparisons, ANP ratings, and/or ANP client data, and transform the data into priority vectors and store into the ANP model. As with traditional ANP, alternatives can be pairwise compared. The data which is input can be transformed into priority vectors, as with traditional ANP, and matrix transformations can be prepared. The result can be stored into the ANP, such as the ANP storage memory 329 with ANP weighted supermatrix in the memory 311.

Optionally, other components may be incorporated in the computer 301 to produce other actions. For example, a user can interface with the computer 301, via a known user interface such as OUTLOOK software, WINDOWS software, and/or other commercially available interfaces. Further, the computer 301 can send and receive transmissions via known networking applications operating with the communication port 333 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 309 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The ANP storage memory 329 is illustrated as being part of memory 311 stored locally on the controller 303. It will be appreciated that the ANP storage memory 329 can be stored remotely, for example, accessed via the communication port 333 or similar.

The computer 301 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions that are executed by the processor 309 and/or an ANP model can be obtained, for example, from the drive, via the communication port 333, or via the memory 311.

Figure 4:
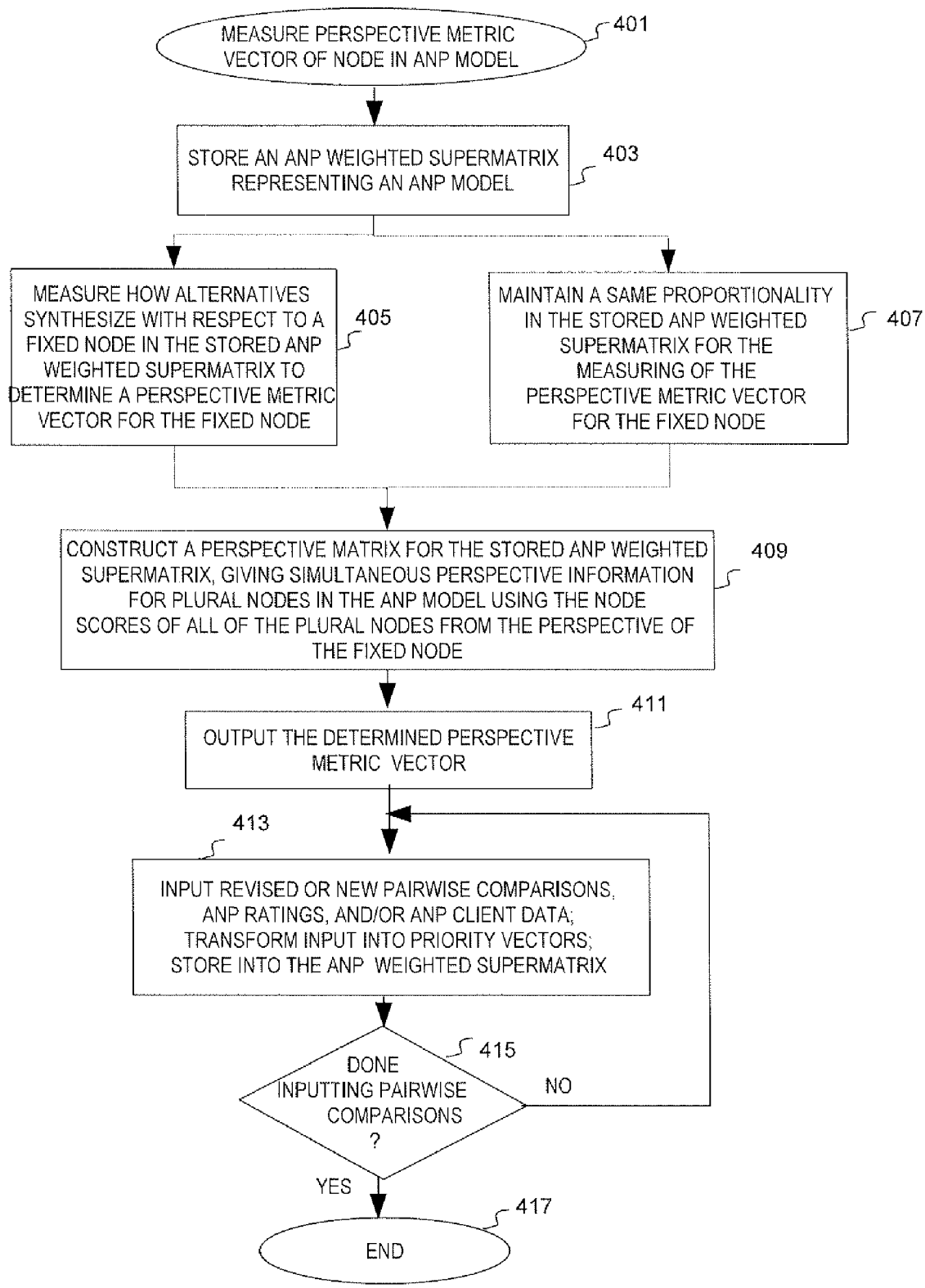
FIG. 4 is a flow chart illustrating a procedure to measure a perspective metric vector of a node in an ANP model.

Referring now to FIG. 4, a flow chart illustrating a procedure to measure a perspective metric vector of a node in an ANP model will be discussed and described. The procedure can advantageously be implemented on, for example, a processor of a controller, described in connection with FIG. 4 or other apparatus appropriately arranged. In overview, the procedure 401 includes storing 403 an ANP weighted supermatrix representing an ANP model; measuring 405 how alternatives synthesize with respect to a fixed node in the stored ANP weighted supermatrix to determine a perspective metric vector for the fixed node; and throughout the process of measuring, maintaining 407 a same proportionality of the stored ANP weighted supermatrix. The procedure 401 can also include constructing 409 a perspective matrix for the stored ANP weighted supermatrix, giving simultaneous perspective information for plural nodes in the ANP model using the node scores of all of the plural nodes from the perspective of the fixed node. The procedure 401 can also include outputting 411 the determined marginal influence of the node which was changed. Furthermore, the procedure 401 can include inputting 413 ANP data (e.g., pairwise comparisons) and storing it into the ANP weighted supermatrix. The inputting 413 can continue until, for example, the user is done 415 inputting, e.g., pairwise comparisons, and then can end 417. Each of these is explained in more detail below, except that details which have been previously discussed may not be repeated below.

The procedure 401 can include storing 403 an ANP weighted supermatrix representing an ANP model. Before storing the ANP weighted supermatrix, values in the ANP weighted supermatrix can be obtained from an ANP model, for example, by inputting pairwise comparisons and creating an ANP weighted supermatrix therefrom, through various known techniques.

The procedure 401 can include measuring 405 how alternatives synthesize with respect to a fixed node in the stored ANP weighted supermatrix to determine a perspective metric vector for the fixed node. This has been discussed above in detail, and will not be repeated here.

The procedure 401 can include, throughout the process of measuring 405, maintaining 407 a same proportionality of the stored ANP weighted supermatrix. This has been discussed above in detail. Although the priorities are perturbed, the proportionality in the ANP weighted supermatrix of the unperturbed nodes to each other is maintained. The measuring 405 and the maintaining of proportionality 407 are illustrated in parallel since they both are performed simultaneously, so that even as the measurements 405 are taken by changing the importance of the fixed node, the proportionality of the stored ANP weighted supermatrix is maintained 407.

The procedure 401 can also include constructing 409 a perspective matrix for the stored ANP weighted supermatrix, giving simultaneous perspective information for plural nodes in the ANP model using the node scores of all of the plural nodes from the perspective of the fixed node. The process of constructing 409 a perspective matrix can be omitted.

The procedure 401 can also include outputting 411 the determined perspective metric vector.

For example, the calculated value of the perspective metric vector, and/or the results of the alternatives scores at the limit, from the perspective of the node, can be output. The value can be shown as part of a representation of a supermatrix, as part of a conventional bar graph, as part of another graph, and/or a standalone value. Similarly, the marginal influence can be output in a visual representation. A user can make a decision regarding changes to the ANP model, for example based on the perspective metric vector of the node and/or the perspective matrix which is output.

Furthermore, the procedure 401 can include inputting 413 ANP data (e.g., pairwise comparisons) and storing it into the ANP weighted supermatrix. The inputting 413 can continue until, for example, the user is done 415 inputting, e.g., pairwise comparisons. The input of revised or new pairwise comparisons, rating, and/or ANP client data into the ANP weighted supermatrix can be done in accordance with known techniques for modifying data in an ANP, such as by interacting with a user. The process 401 can input 413 pairwise comparisons, ANP ratings, and/or ANP client data. The user interface side of inputting pairwise comparisons, ratings, or client data can be performed according to known techniques. For example, the process 401 can query the user to input, "with respect to opportunities, which is more important: social or political?" to input values of a pairwise comparison of the social and political opportunities nodes. Also, the process 401 can transform the input values into priority vectors in accordance with known techniques. Further, the process 401 can store the new or modified input values and the priority vectors into the ANP model. The process can loop if not done 415 inputting pairwise comparisons, or can finish at an end 417.

Figure 5:
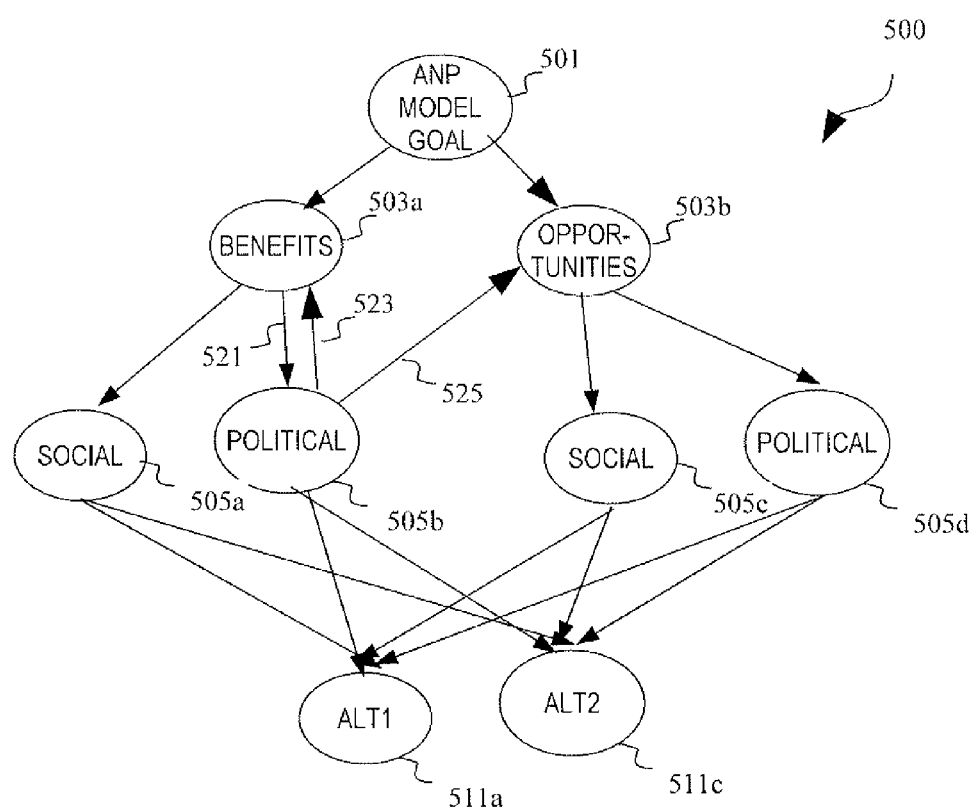
FIG. 5 is a diagram illustrating a simplified representation of an ANP model.

Referring now to FIG. 5, a diagram illustrating a simplified representation of an ANP model will be discussed and described. The illustration is simplified for ease of discussion. In the ANP model, there are conventionally provided control criteria that are benefits, costs, opportunities, and risks (commonly abbreviated BOCR). At the top of the ANP model 500, there is provided an ANP model goal 501, benefits 503a and opportunities 503b. (The usual costs and risks are not shown.) The benefits 503a is a node that includes a one way directional link from the benefits 503a node to the social benefits node 505a and the political benefits node 505b. The opportunities 503b is a node that includes a one way directional link from the opportunities 503b node to the social opportunities node 505c and the political opportunities node 505d. The political benefits node 505b includes a one way directional connection to the benefits node 503a and the opportunities node 503b. Each of the social benefits node 505a, the political benefits node 505b, the social opportunities node 505c and the political opportunities node 505d includes a separate one-way directional connection to alternative ALT1 511a and alternative ALT2 511c.

In a conventional ANP model, the connection defines how important the destination node is to the source node. Hence, a connection is directional, that is, it has a from direction and a to direction. For example, a connection from the conventional ANP model goal 501 to the benefits node 503a means that the user can define how important benefits are to the goal.

One of skill in this art will know that the ANP model can be represented as a matrix (or series of matrices), where a node is represented as a row in the matrix.

The designations in the following list are defined and expressly used herein as would be understood to one of skill in the ANP art, and not according to a general dictionary, whether singular or plural: "priority," "node", "importance" (or "important"), "sensitivity," "pairwise comparison", "ANP ratings" (or "ratings"), "ANP client data", "priority vectors", "judgment of priority," "ANP alternatives" (or "alternatives"), "criteria", "weight," "cluster," "local," "global," "synthesize." This list is not exhaustive and does not imply that a term not on this list can be interpreted according to a general dictionary instead of according to an understood ANP meaning. Some of these are further explained below for the reader's convenience.

"Pairwise comparison." The point of a pairwise comparison set is to arrive at the priorities of a group of things. These things may be criteria (so-called "alternatives" in the traditional ANP sense), or ratings scales. In a classic example of doing pairwise comparisons, one can answer the question, "how many times better is X than Y" for all X and Y being compared.

"ANP Ratings." If one thinks of a single column of the conventional ANP's rating system as conventionally represented in a matrix, its point is to assign ideal priorities to the alternatives (with respect to a criteria). The ratings prioritize alternatives in a set of alternatives. In a classic example of doing ANP ratings, one first sets up ratings words like "High", "Medium" and "Low", and gives scores to those words; then each of the things being rated is assigned a "High", "Medium" or "Low."

"ANP client data." ANP client data are data that represent real world values. For example, in a decision about an automobile purchase, ANP client data could be miles per gallon, number of passengers, headroom, cubic size of storage, etc.

The term "analytic network process" ("ANP") model, sometimes referred to as an ANP network model, an ANP network or similar, is defined herein to refer to a form of an analytic hierarchy process (AHP) in which values for higher level elements are affected by lower level elements and take the dependency of the lower level elements into account; further in the ANP model, the importance of the criteria determines the importance of the alternatives (as in an AHP); the importance of the alternatives themselves determines the importance of the criteria; further, the ANP model additionally has influence flowing between non-downward elements (in comparison to a conventional AHP model, in which influence flows only downwards); further the ANP model is a network, that is not a top-down-tree, of priorities and alternative choices. The terms "influence", "criteria", and "alternatives" are understood to those of skill in the AHP art. An ANP is further discussed in, e.g., Saaty, T. L. (2001) *Decision Making with Dependence and Feedback: the Analytic Network Process, 2nd edition*.

The term "ANP weighted supermatrix" is defined as the supermatrix which is created from the ANP model, and which has been weighted, in accordance with ANP theory, and variations, extensions, and/or evolutions of such ANP theory. The ANP supermatrix is understood to be represented in rows and columns.

The above is sometimes described in terms of a single user, for ease of understanding and illustration. However, it is understood that multiple users can be accommodated in various embodiments. For example, multiple users each can input pairwise comparisons.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, any of which can be referred to as a "computer", as well as networked combinations of the same, and the like, although other examples are possible as will be appreciated by one of skill in the art, any of which can be referred to as a "computer-implemented system."

One or more embodiments may rely on the integration of various components including, as appropriate and/or if desired, hardware and software servers, database engines, and/or other content providers. One or more embodiments may be connected over a network, for example the Internet, an intranet, a wide area network (WAN), a local area network (LAN), or even on a single computer system. Moreover, portions can be distributed over one or more computers, and some functions may be distributed to other hardware, in accordance with one or more embodiments.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
an analytic network process (ANP) storage memory that stores an ANP weighted supermatrix representing an ANP model; and
a processor in communication with the ANP storage memory, the processor being configured to facilitate
measuring how alternatives synthesize with respect to a fixed node in the stored ANP weighted supermatrix to determine a perspective metric vector for the fixed node; and
maintaining a same proportionality in the stored ANP weighted supermatrix, while inducing a family of row perturbation changes within the ANP supermatrix by predetermined amounts of an ANP-row-family-parameter, for the measuring of the perspective metric vector for the fixed node.

2. The apparatus of claim 1,
wherein the measuring of the perspective metric vector comprises pushing an overall importance of the fixed node toward a value of 1, and then synthesizing over the stored ANP weighted supermatrix.

3. The apparatus of claim 2, the pushing of the importance comprising inducing a family of ANP models by row perturbations of the fixed node in the stored ANP weighted supermatrix of plural predetermined amounts so as to take a limit as a priority of the fixed node goes toward the value of 1, the alternative score further being synthesized from alternative scores of the fixed node in the induced family of ANP models.

4. The apparatus of claim 1, the perspective metric vector being measured consistent with at least one of the formulas:
a synthesized value of alternative i from the perspective of the fixed node r being $$p_{r,i} = \lim_{p \to 1} s_{r,i}(p); \text{ and}$$

a total synthesized vector being denoted by
$P_r = (p_{r,1}, \ldots, P_{r,a})$
A being the ANP model,
W being the weighted supermatrix of a single level of the ANP model (of dimensions n×n),
W(p) being a family of row perturbations of row $1 \leq r \leq n$ of W, $s_{r,i}(p)$ the synthesized score for alternative i for the family of ANP row perturbations of row r at parameter value p, $A(p)$ being the induced family of ANP models, the ANP model having a alternatives.

5. The apparatus of claim 1, further comprising constructing a perspective matrix for the stored ANP weighted supermatrix, giving simultaneous perspective information for plural nodes in the network using the node scores of all of the plural nodes from the perspective of the fixed node.

6. The apparatus of claim 1, further comprising:

an output unit in communication with the processor and configured to output, for a display to a user, the determined perspective metric vector.

7. The apparatus of claim 1, further comprising an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

8. A method, comprising:

storing, in an analytic network process (ANP) storage memory, an ANP weighted supermatrix representing an ANP model; and in a processor in communication with the ANP storage memory, measuring how alternatives synthesize with respect to a fixed node in the stored ANP weighted supermatrix to determine a perspective metric vector for the fixed node; and maintaining a same proportionality in the stored ANP weighted supermatrix, while inducing a family of row perturbation changes within the ANP supermatrix by predetermined amounts of an ANP-row-family-parameter, for the measuring of the perspective metric vector for the fixed node.

9. The method of claim 8, wherein the measuring of the perspective metric vector comprises pushing an overall importance of the fixed node toward a value of 1, and then synthesizing over the stored ANP weighted supermatrix.

10. The method of claim 9, the pushing of the importance comprising inducing a family of ANP models by row perturbations of the fixed node in the stored ANP weighted supermatrix of plural predetermined amounts so as to take a limit as a priority of the fixed node goes toward the value of 1, the alternative score further being synthesized from alternative scores of the fixed node in the induced family of ANP models.

11. The method of claim 8, the perspective metric vector being measured consistent with at least one of the formulas:

a synthesized value of alternative i from the perspective of the fixed node r being $$p_{r,i} = \lim_{p \to 1} s_{r,i}(p); \text{ and}$$

a total synthesized vector being denoted by $p_r = (p_{r,1}, \ldots, p_{r,a})$

A being the ANP model,

W being the weighted supermatrix of a single level of the ANP model (of dimensions n×n), $W(p)$ being a family of row perturbations of row $1 \le r \le n$ of W, $s_{r,i}(p)$ being the synthesized score for alternative i for the family of ANP row perturbations of row r at parameter value p, $A(p)$ being the induced family of ANP models, the ANP model having a alternatives.

12. The method of claim 8, further comprising constructing a perspective matrix for the stored ANP weighted supermatrix, giving simultaneous perspective information for plural nodes in the network using the node scores of all of the plural nodes from the perspective of the fixed node.

13. The method of claim 8, further comprising:

outputting, to an output unit in communication with the processor, for a display to a user, the determined perspective metric vector.

14. The method of claim 8, further comprising inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

15. A non-transitory computer-readable storage medium encoded with computer executable instructions, wherein execution of said computer executable instructions by one or more processors causes a computer to perform the steps of:

storing, in an analytic network process (ANP) storage memory, an ANP weighted supermatrix representing an ANP model;

measuring how alternatives synthesize with respect to a fixed node in the stored ANP weighted supermatrix to determine a perspective metric vector for the fixed node; and maintaining a same proportionality in the stored ANP weighted supermatrix, while inducing a family of row perturbation changes within the ANP supermatrix by predetermined amounts of an ANP-row-family-parameter, for the measuring of the perspective metric vector for the fixed node.

16. The non-transitory computer-readable storage medium of claim 15, wherein the measuring of the perspective metric vector comprises pushing an overall importance of the fixed node toward a value of 1, and then synthesizing over the stored ANP weighted supermatrix.

17. The non-transitory computer-readable storage medium of claim 16, the pushing of the importance comprising inducing a family of ANP models by row perturbations of the fixed node in the stored ANP weighted supermatrix of plural predetermined amounts so as to take a limit as a priority of the fixed node goes toward the value of 1, the alternative score further being synthesized from alternative scores of the fixed node in the induced family of ANP models.

18. The non-transitory computer-readable storage medium of claim 15, the perspective metric vector being determined consistent with at least one of the formulas:

a synthesized value of alternative i from the perspective of the fixed node r being $$p_{r,i} = \lim_{p \to 1} s_{r,i}(p); \text{ and}$$

a total synthesized vector being denoted by $p_r = (p_{r,1} \ldots p_{r,a})$

A being the ANP model,

W being the weighted supermatrix of a single level of the ANP model (of dimensions n×n), W(p) being a family of row perturbations of row $1 \leq r \leq n$ of W, $s_{r,i}(p)$ being the synthesized score for alternative i for the family of ANP row perturbations of row r at parameter value p, A(p) being the induced family of ANP models, the ANP model having a alternatives.

19. The non-transitory computer-readable storage medium of claim 15, further comprising constructing a perspective matrix for the stored ANP weighted supermatrix, giving simultaneous perspective information for plural nodes in the network using the node scores of all of the plural nodes from the perspective of the fixed node.

20. The non-transitory computer-readable storage medium of claim 15, further comprising:

outputting, to an output unit for a display to a user, the determined perspective metric vector.

21. The non-transitory computer-readable storage medium of claim 15, further comprising inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

* * * * *